United States Patent
Nunome et al.

(10) Patent No.: US 9,415,432 B2
(45) Date of Patent: Aug. 16, 2016

(54) ROLL FORMING METHOD AND ROLL FORMING APPARATUS

(71) Applicants: Aisin Seiki Kabushiki Kaisha, Kariya-shi (JP); Hisada Co., Ltd., Anjo-shi (JP)

(72) Inventors: Takashi Nunome, Obu (JP); Koji Yoshida, Anjo (JP); Masashi Saeki, Toyota (JP); Masahiro Hashiguchi, Toyota (JP)

(73) Assignees: AISIN SEIKI KABUSHIKI KAISHA, Kariya-shi (JP); HISADA CO., LTD., Anjo-shi (JP)

( * ) Notice: Subject to any disclaimer, the term of this patent is extended or adjusted under 35 U.S.C. 154(b) by 437 days.

(21) Appl. No.: 14/083,892

(22) Filed: Nov. 19, 2013

(65) Prior Publication Data
US 2014/0137622 A1    May 22, 2014

(30) Foreign Application Priority Data

Nov. 19, 2012   (JP) ................................. 2012-252900

(51) Int. Cl.
*B21B 1/26*      (2006.01)
*B21D 5/08*      (2006.01)
(Continued)

(52) U.S. Cl.
CPC ................ *B21D 5/08* (2013.01); *C21D 9/0068* (2013.01); *C21D 1/18* (2013.01); *C21D 9/60* (2013.01); *Y02P 10/253* (2015.11)

(58) Field of Classification Search
CPC .... B21D 5/08; B21B 45/004; B21B 45/0281; B21B 1/32; B21B 37/16; C21D 8/02; C21D 9/60; C21D 1/18; C21D 9/0068; C21C 38/001; B21C 37/08

USPC .......................................... 72/201, 11.3, 12.2
See application file for complete search history.

(56) References Cited

U.S. PATENT DOCUMENTS 3,812,693 A * 5/1974 Kamogawa ............... B21B 7/16
                                                                    72/12.2
4,505,141 A * 3/1985 Thomas ..................... B21B 1/32
                                                                    72/201
(Continued)

FOREIGN PATENT DOCUMENTS

JP        7-144223        6/1995
JP        2007-83304      4/2007
(Continued)

OTHER PUBLICATIONS

Partial English translation of Office Action mailed Apr. 19, 2016 and issued to JP2012-252900.

*Primary Examiner* — David B Jones
(74) *Attorney, Agent, or Firm* — Oblon, McClelland, Maier & Neustadt, L.L.P (57) ABSTRACT

A roll forming method includes: performing a cross-section forming process to causing a steel strip, to pass through a forming roll die so that a cross-sectional shape of the steel strip is formed into a predetermined cross-sectional shape; performing a heating process of heating the steel strip to a first temperature that is equal to or higher than an austenitizing temperature; performing a preliminary cooling process of cooling the steel strip to a second temperature lower than the austenitizing temperature and equal to or higher than a martensite transformation point; performing a cross-section correcting process of causing the steel strip to pass through a correction roll die and correcting the cross-sectional shape of the steel strip, and performing a main cooling process of cooling the steel strip having passed through the correction roll die to a third temperature lower than the martensite transformation point.

12 Claims, 7 Drawing Sheets

(51) Int. Cl.
*C21D 9/00* (2006.01)
*C21D 9/60* (2006.01)
*C21D 1/18* (2006.01)

(56) References Cited

U.S. PATENT DOCUMENTS

| | | | |
|---|---|---|---|
| 2008/0066517 | A1 | 3/2008 | Tomizawa et al. |
| 2011/0162424 | A1* | 7/2011 | Seidel ................. B21B 45/0281 72/11.3 |
| 2012/0247605 | A1* | 10/2012 | De ......................... B21C 37/08 138/177 |
| 2013/0263634 | A1* | 10/2013 | Seidel ................... B21B 45/004 72/39 |
| 2013/0323112 | A1* | 12/2013 | Okamoto .............. C22C 38/001 420/83 |
| 2014/0137622 | A1* | 5/2014 | Nunome ................. B21D 5/08 72/201 |
| 2014/0308156 | A1* | 10/2014 | Oh ........................... C21D 8/02 420/73 |

FOREIGN PATENT DOCUMENTS

| | | |
|---|---|---|
| JP | 2007-275937 | 10/2007 |
| WO | WO2010/082584 | 7/2010 |

* cited by examiner

CROSS-SECTIONAL PHOTOGRAPH BEFORE QUENCHING

CROSS-SECTIONAL PHOTOGRAPH AFTER QUENCHING

ROLL FORMING METHOD AND ROLL FORMING APPARATUS

CROSS-REFERENCE TO RELATED APPLICATION

This application claims priority from Japanese Patent Application No. 2012-252900 filed on Nov. 19, 2012, the entire subject matter of which is incorporated herein by reference.

TECHNICAL FIELD

This disclosure generally relates to a roll forming method and a roll forming apparatus of a steel strip.

BACKGROUND

For example, a reinforcement part (door reinforcement) of a vehicular door is formed by roll forming a zinc-plated steel strip, cutting the steel strip into a predetermined length and then heat treating the same so as to secure desired strength.

Therefore, the reinforcement part of the vehicular door is manufactured through the roll forming process and the heat treatment process thereafter.

JP-A-2007-83304 discloses a forming apparatus that bends and forms a roll-formed product after roll-forming of a metallic steel plate. According to the forming apparatus disclosed in JP-A-2007-83304, the roll-formed product is bent and heated at the same time and is then rapidly cooled, so that the heat-treated roll-formed product is manufactured.

SUMMARY

According to the forming apparatus disclosed in JP-A-2007-83304, the heat treatment is performed after the roll forming is completed. When the heat treatment is performed after the roll forming is completed, cross-sectional deformation is caused due to the heating. For this reason, a cross-sectional shape upon the completion of the roll forming is different from a cross-sectional shape after the heat treatment. A cross-sectional shape upon the completion of the roll forming may be predetermined so that a cross-sectional shape after the heat treatment coincides with a purposed cross-sectional shape. However, it is difficult to predict an amount of the cross-sectional deformation. For this reason, it is difficult to predetermine a cross-sectional shape upon the completion of the roll forming by predicting the cross-sectional deformation caused due to the heating.

This disclosure provides at least a roll forming method and a roll forming apparatus capable of obtaining a roll-formed product in which cross-sectional deformation caused due to heat treatment is suppressed.

A roll forming method according to this disclosure includes: performing a cross-section forming process to causing a steel strip, which is fed in a longitudinal direction, to pass through a forming roll die so that a cross-sectional shape of the steel strip is formed into a predetermined cross-sectional shape; performing a heating process of heating the steel strip having passed through the forming roll die to a first temperature that is equal to or higher than an austenitizing temperature; performing a preliminary cooling process of cooling the steel strip heated to the first temperature in the heating process to a second temperature lower than the austenitizing temperature and equal to or higher than a martensite transformation point; performing a cross-section correcting process of causing the steel strip cooled to the second temperature in the preliminary cooling process to pass through a correction roll die and correcting the cross-sectional shape of the steel strip, and performing a main cooling process of cooling the steel strip having passed through the correction roll die to a third temperature lower than the martensite transformation point.

A roll forming apparatus according to this disclosure includes: a forming roll die configured to form a steel strip, which is fed in a longitudinal direction, into a predetermined cross-sectional shape; a heating device that heats the steel strip having passed through the forming roll die to a first temperature that is equal to or higher than an austenitizing temperature; a preliminary cooling device that cools the steel strip heated by the heating device to a second temperature lower than the austenitizing temperature and equal to or higher than a martensite transformation point; a correction roll die that corrects the cross-sectional shape of the steel strip cooled by the preliminary cooling device, and a main cooling device that cools the steel strip having passed through the correction roll die to a third temperature lower than the martensite transformation point.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
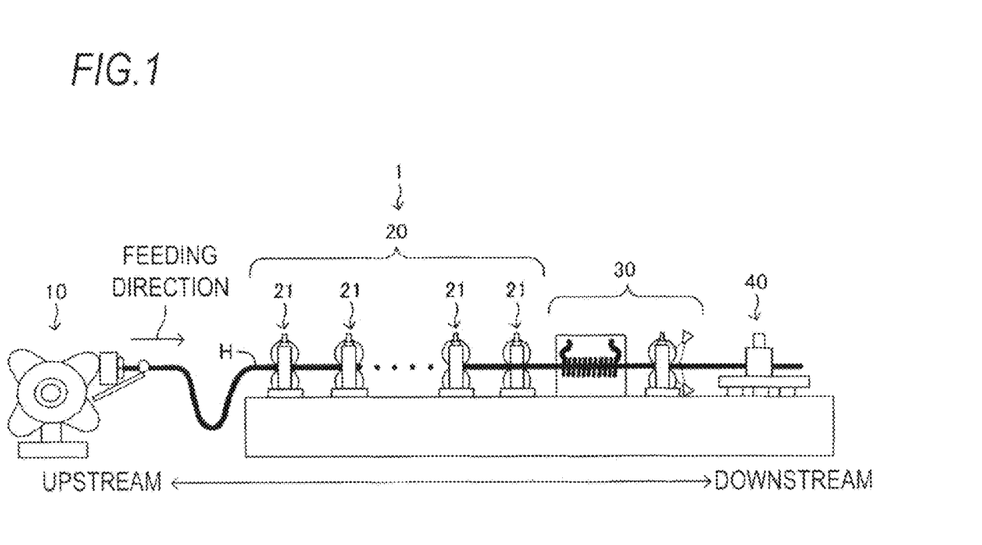
FIG. 1 is a schematic side view of a roll forming apparatus according to an illustrative embodiment.

Hereinafter, an illustrative embodiment of this disclosure will be described. FIG. 1 is a schematic side view of a roll forming apparatus according to an illustrative embodiment. As shown in FIG. 1, a roll forming apparatus 1 of this illustrative embodiment includes an uncoiler 10, a forming roll die (piece) 20, a roll quenching unit 30 and a cutting device 40. The respective members are sequentially arranged in corresponding order along a path line of the roll forming apparatus 1. A steel strip H is fed from the uncoiler 10-side (an upstream side) towards the cutting device 40-side (a downstream side). Here, as shown in FIG. 1, a feeding direction of the steel strip H is defined as a direction from the upstream towards the downstream. In this illustrative embodiment, a zinc-plated steel plate is used as the steel strip.

The uncoiler 10 has a coil part on which the steel strip H is wound in a coil shape and a rotating device that rotates the coil part, and the steel strip H is drawn therefrom at constant speed.

Figure 2:
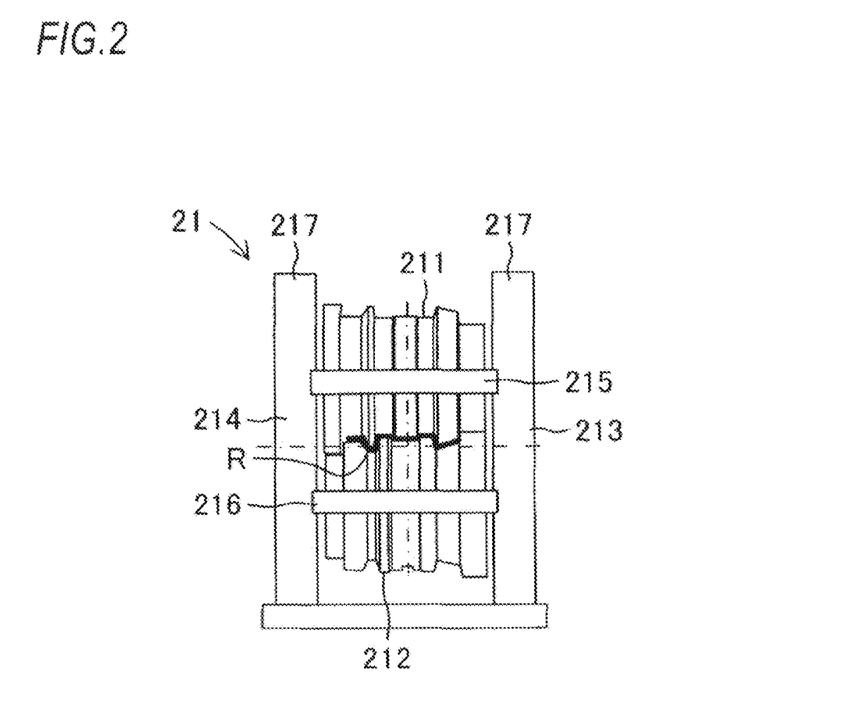
FIG. 2 is a front view of a forming roll stand.

The forming roll die 20 has a plurality of forming roll stands 21. FIG. 2 is a front view of the forming roll stand 21. As shown in FIG. 2, the forming roll stand 21 has an upper-side roll die 211 and a lower-side roll die 212. An upper-side roll shaft 215 is integrally and rotatably attached to a rotating center of the upper-side roll die 211, and a lower-side roll shaft 216 is integrally and rotatably attached to a rotating center of the lower-side roll die 212. The upper-side roll shaft 215 is arranged above the lower-side roll shaft 216. Both ends of both the roll shafts 215, 216 are rotatably supported to stand frames 217, respectively. Both the roll shafts 215, 216 are arranged in parallel with each other. The lower-side roll shaft 216 is connected to a driving device (not shown) at one end thereof and is rotated as a driving force is applied thereto from the driving device. As the lower-side roll shaft 216 is rotated, the lower-side roll die 212 is rotated, so that the steel strip H is fed. The upper-side roll die 211 is rotated by a frictional force with the steel strip H being fed. For this reason, the upper-side roll die 211 and the lower-side roll die 212 are rotated at the same speed in an opposite direction with each other. The plurality of forming roll stands 21 having the above-described configuration is arranged in a straight line shape along the feeding direction of the steel strip H. The steel strip H fed from the uncoiler 10 is introduced into the forming roll die 20. A cross-section of the steel strip H is roll-formed into a predetermined shape by the forming roll die 20. Then, the steel strip H is fed towards the downstream side of the forming roll die 20. FIG. 2 illustrates a cross-sectional shape of a product R formed by the forming roll stand 21.

Figure 3:
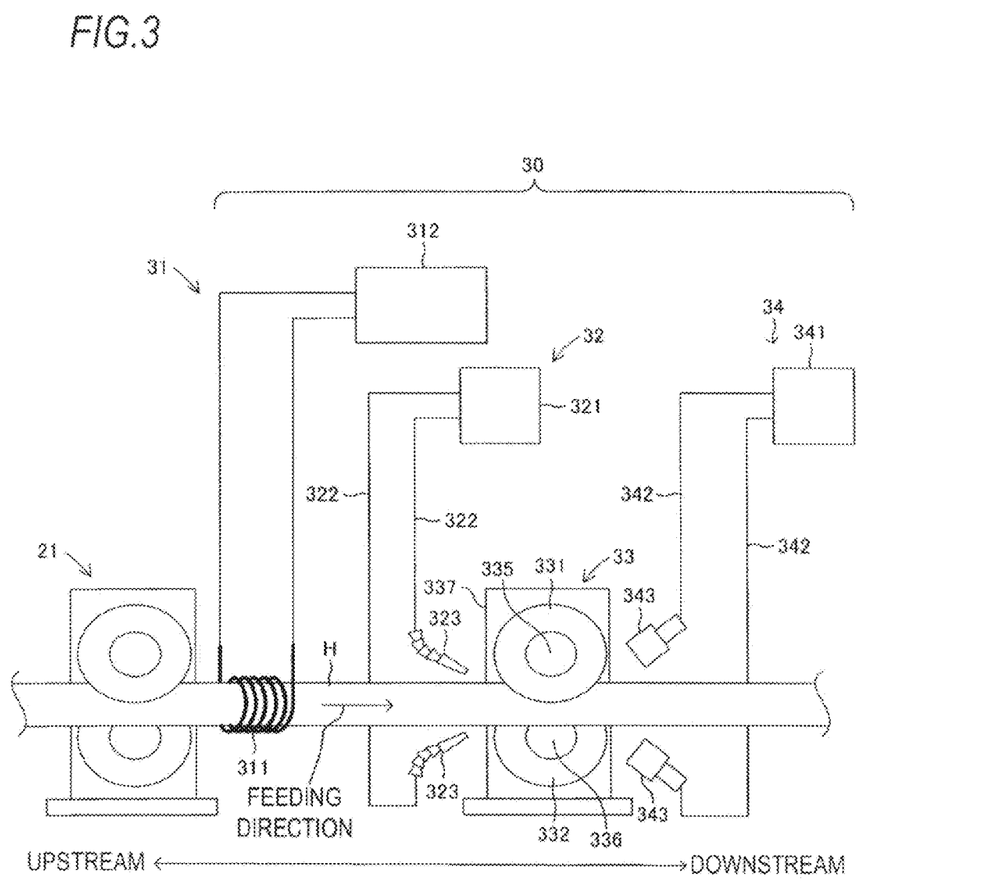
FIG. 3 is a schematic side view illustrating a roll quenching unit.

FIG. 3 is a schematic side view illustrating the roll quenching unit 30. The roll quenching unit 30 is arranged at a downstream side of the forming roll die 20. The roll quenching unit 30 has an induction heater 31, an air blowing device (preliminary cooling device) 32, a correction roll stand (correction roll die) 33 and a cooling water supply device (main cooling device) 34, which are sequentially arranged in corresponding order along the feeding direction of the steel strip H.

The induction heater 31 is arranged at the downstream side of the forming roll die 20 in the feeding direction of the steel strip H. The induction heater 31 has an induction heating coil 311 that is arranged to surround an outer periphery of the steel strip H having passed through the forming roll stand 21 arranged at the most downstream side and an energization control device 312 that controls energization to the induction heating coil 311. When the energization control device 312 applies current to the induction heating coil 311, the steel strip H passing through an inside of the induction heating coil 311 is heated in a moment. Also, the energization control device 312 controls the energization/non-energization (or an energization amount) to the induction heating coil 311, so that it is possible to form a heated part and a non-heated part in the steel strip H.

The air blowing device 32 is arranged at the downstream side of the induction heater 31 in the feeding direction of the steel strip H. The air blowing device 32 is configured to inject cooling air to the steel strip H having passed through the induction heater 31. In this illustrative embodiment, the air blowing device 32 has a compressed air supply source 321, a supply piping 322 that is connected to the compressed air supply source 321 and an air nozzle 323 that is attached to a leading end of the supply piping 322. The compressed air in the compressed air supply source 321 is supplied to the air nozzle 323 through the supply piping 322. The compressed air is injected from an injection port of the air nozzle 323. As the compressed air supply source 321, factory air is used, for example.

The correction roll stand 33 is arranged at the downstream side of the air blowing device 32 (the air nozzle 323) in the feeding direction of the steel strip H. Like the forming roll stand 21, the correction roll stand 33 has an upper-side roll die 331 and a lower-side roll die 332. An upper-side roll shaft 335 is integrally and rotatably attached to a rotating center of the upper-side roll die 331 and a lower-side roll shaft 336 is integrally and rotatably attached to a rotating center of the lower-side roll die 332. The upper-side roll shaft 335 is arranged above the lower-side roll shaft 336. Both ends of both the roll shafts 335, 336 are rotatably supported to correction stand frames 337, respectively. Both the roll shafts 335, 336 are arranged in parallel with each other. The lower-side roll shaft 336 is connected to a driving device (not shown) and is rotated as a driving force is applied thereto from the driving device. As the lower-side roll shaft 336 is rotated, the lower-side roll die 332 is rotated, so that the steel strip H is fed. The upper-side roll die 331 is rotated by the frictional force with the steel strip H being fed. For this reason, the upper-side roll die 331 and the lower-side roll die 332 are rotated at the same speed in an opposite direction. The steel strip H having passed through the forming roll die 20 is fed to the correction roll stand 33.

Here, as can be seen from FIG. 3, the injection port of the air nozzle 323 is directed towards an introducing part (a part into which the steel strip H is introduced) of the correction roll stand 33 positioned at the downstream side of the injection port. Therefore, the compressed air is injected from the air nozzle 323 towards the correction roll stand 33 from the upstream side of the correction roll stand 33. That is, the compressed air is injected from the air nozzle 323 towards the feeding direction of the steel strip H. The compressed air flowing towards the feeding direction of the steel strip H is injected to the steel strip H just before the steel strip H is fed to the correction roll stand 33.

The cooling water supply device 34 has a cooling water supply source 341, a supply piping 342 that is connected to the cooling water supply source 341 and a cooling water injection nozzle 343 that is attached to a leading end of the supply piping 342. The cooling water in the cooling water supply source 341 is supplied to the cooling water injection nozzle 343 through the supply piping 342. Then, the cooling water is injected from the cooling water injection nozzle 343. This cooling water is injected to the steel strip H having passed through the correction roll stand 33.

Here, as can be seen from FIG. 3, the injection port of the cooling water injection nozzle 343 is directed towards an ejecting part (a part through which the steel strip H is discharged) of the correction roll stand 33 positioned at the upstream side of the injection port. Therefore, the cooling water is injected from the cooling water injection nozzle 343 towards the correction roll stand 33 from the downstream side of the correction roll stand 33. That is, the cooling water is injected from the cooling water injection nozzle 343 towards an opposite direction to the feeding direction of the steel strip H. The cooling water flowing towards the opposite direction to the feeding direction of the steel strip H is injected to the steel strip H just after the steel strip H is discharged from the correction roll stand 33.

As shown in FIG. 1, the cutting device 40 is arranged at the downstream side of the roll quenching unit 30. The cutting device 40 cuts the roll quenching unit 30 having passed through the roll quenching unit 30 into a desired length.

An operation of the roll forming apparatus 1 having the above-described configuration is described. The steel strip H fed from the uncoiler 10 is first fed to the forming roll die 20. Whenever the steel strip H passes between the upper-side roll dies 211 and the lower-side roll dies 212 of the forming roll stands 21, it is plastically deformed and is thus roll-formed into a predetermined cross-sectional shape (the cross-section forming process).

The steel strip H having passed through the forming roll die 20 is fed downstream from the forming roll die 20 and passes through the inside of the induction heating coil 311. At this time, the induction heating coil 311 is energized, so that the steel strip H passing through the inside of the induction heating coil 311 is heated (the heating process). In this illustrative embodiment, the heating temperature is regulated so that the steel strip H is heated to a temperature (the first temperature) equal to or higher than an austenitizing temperature of the steel strip H and equal to or lower than an evaporation temperature of the zinc plating formed on the surface of the steel strip. Here, the cross-sectional shape of the steel strip H formed in the cross-section forming process is deformed by the heating.

The steel strip H heated to the first temperature by the induction heater 31 is fed to the correction roll stand 33 positioned at the downstream side of the induction heating coil 311. However, just before the steel strip H is fed, the steel strip H is cooled by the compressed air injected from the air nozzle 323 (the preliminary cooling process). In this illustrative embodiment, a flow rate of the compressed air is regulated so that the steel strip H is cooled to a temperature (the second temperature) lower than the austenitizing temperature of the steel strip H and equal to or higher than a martensite transformation point.

The steel strip H cooled to the second temperature by the injected compressed air is fed to the correction roll stand 33. The steel strip H is plastically deformed with being interposed between the upper-side roll die 331 and the lower-side roll die 332 of the correction roll stand 33, so that the cross-sectional shape deformed due to the heating is corrected (the cross-section correcting process). In this case, as described above, the temperature (the second temperature) of the steel strip H fed to the correction roll stand 33 is lower than the austenitizing temperature and equal to or higher than the martensite transformation point. When a metallic steel plate is heated to a temperature of the austenitizing temperature or higher and then quenched to a temperature lower than the martensite transformation point, the hardening of the metallic steel plate by the quenching is initiated. In the cross-section correcting process of this illustrative embodiment, since the temperature of the steel strip H is still the martensite transformation point or higher, the hardening by the quenching is not initiated yet, so that the metallic steel plate is relatively soft. For this reason, the cross-sectional shape of the steel strip H deformed by the heating in the heating processing is easily corrected while the steel strip H passes through the correction roll stand 33.

Incidentally, in this illustrative embodiment, the surface shapes of the upper-side roll die 331 and the lower-side roll die 332 of the correction roll stand 33 are the same as those of the upper-side roll die 211 and the lower-side roll die 212 of the forming roll stand 21, which is positioned at the most downstream side, of the forming roll stands 21. However, the surface shapes of the upper-side roll die 331 and the lower-side roll die 332 may be formed to be different from the surface shapes of the upper-side roll die 211 and the lower-side roll die 212 of the forming roll stand 21 positioned at the most downstream side by adding a deformation amount caused due to residual heat.

The cooling water that is injected from the cooling water injection nozzle 343 of the cooling water supply device 34 is injected (contacted) to the steel strip 11 just after it passes through the correction roll stand 33. Thereby, the steel strip H is rapidly cooled to a temperature (the third temperature) lower than the martensite transformation point, for example, to a room temperature (the main cooling process). By this rapid cooling, the steel strip H is hardened. In this case, the cold heat of the steel strip H cooled by the cooling water injected from the cooling water injection nozzle 343 or the cold heat of the cooling water itself is also transferred to the part corrected by the correction roll stand 33. That is, the steel strip H is rapidly cooled while the cross-sectional shape thereof is corrected (i.e., the cross-sectional shape is restrained) by the correction roll stand 33.

After that, the steel strip H is fed to the cutting device 40. By the cutting device 40, the steel strip H is cut into a desired length (the cutting process). Through the above processes, the roll-formed product having a desired cross-sectional shape is manufactured.

Figure 4:
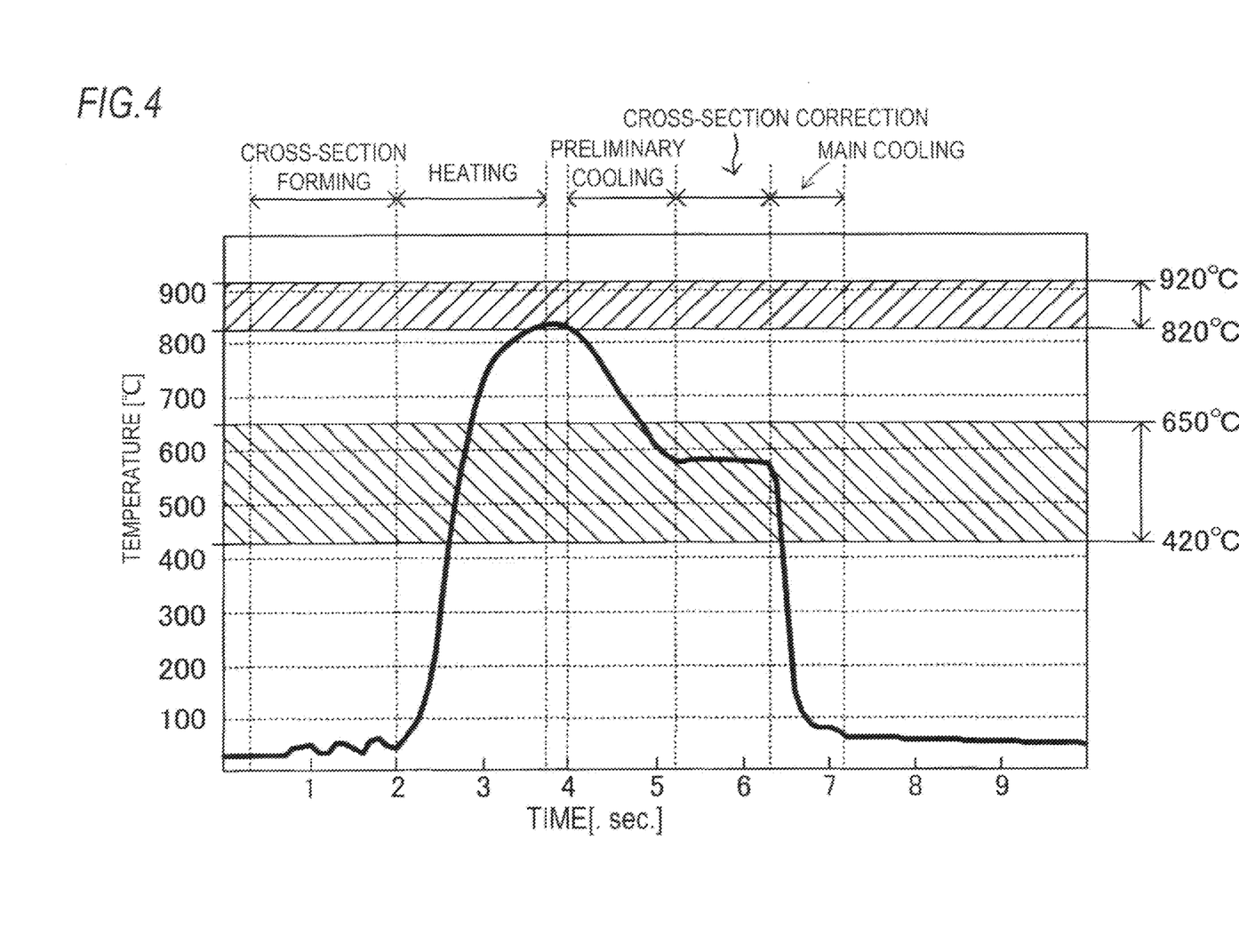
FIG. 4 is a graph illustrating a temperature change of a steep strip H from a forming process to a main cooling process.

FIG. 4 is a graph illustrating a temperature change of the steep strip H from the cross-section forming process to the main cooling process, in which a horizontal axis indicates time and a vertical axis indicates temperatures. As shown in FIG. 4, in the cross-section forming process, the temperature of the steel strip H is approximately close to the room temperature. Also, in the heating process, the steel strip H having passed through the forming roll die 20 is heated by the induction heater 31, so that the temperature of the steel strip H is rapidly increased. In this illustrative embodiment, the steel strip H is finally heated to about 830° C. (the first temperature). Here, the austenitizing temperature of the steel strip H described in this illustrative embodiment is about 820° C. Therefore, in the heating process, the steel strip is heated to the austenitizing temperature or higher. Also, the temperature of the steel strip H heated in the heating process is lower than 920° C. that is the evaporation temperature of the zinc plating. Hence, it does not cause a situation where the zinc plating on the surface of the steel strip H is evaporated and stripped due to the heating in the heating process.

Also, the steel strip H is cooled in the preliminary cooling process, so that the temperature thereof is lowered to about 580° C. (the second temperature). Here, the martensite transformation point of the steel strip H described in this illustrative embodiment is about 420° C. Therefore, the hardening of the steel strip H by the quenching is not initiated yet at the time at which the preliminary cooling process is over. Also, the temperature of the steel strip H cooled in the preliminary cooling process is lower than 650° C. that is the adherence temperature of the zinc plating to the roll die. Hence, it does not cause a situation where the zinc plating on the surface of the steel strip H is adhered to the upper-side roll die 331 and the lower-side roll die 332 of the correction roll stand 33 in the cross-section correcting process thereafter and the zinc plating is thus stripped from the steel strip H.

Also, the steel strip H is heated in the heating process, so that the cross-sectional shape of the steel strip H formed in the cross-section forming process is deformed. However, this deformation is corrected in the cross-section correcting process. Here, as described above, the temperature of the steel strip H in the cross-section correcting process is higher than the martensite transformation point (420° C.), which is the starting temperature of the hardening by the quenching, so that the hardening by the quenching is not caused yet in the steel strip H to be fed to the correction roll stand 33. Hence, the deformed cross-sectional shape is securely corrected by the correction roll stand 33.

In the main cooling process, the liquid cooling medium (the cooling water) is injected to the surface of the steel strip H, so that the temperature thereof is rapidly cooled to the temperature (the third temperature) of the martensite transformation point or lower, for example to the room temperature. For this reason, the hardening by the quenching is initiated, so that the steel strip H is hardened. In the meantime, as can be seen from FIG. 4, it takes about four seconds for the temperature of the steel strip H to increase to the austenitizing temperature or higher and then to decrease to the temperature lower than the martensite transformation point. The material that can be quenched even at this cooling rate has been already developed.

As described above, according to this illustrative embodiment, since the temperature of the steel strip H before the cross-section correcting process is higher than the starting temperature (the martensite transformation point) of the hardening by the quenching, the steel strip H is not hardened upon the cross-section correction, so that the cross-section deformation caused due to the heating can be easily corrected upon the cross-section correction. Thereafter, the temperature of the steel strip H is lowered to the starting temperature (the martensite transformation point) or lower of the hardening, so that the steel strip H can be hardened. Also, the cross-section correcting process and the quenching process (the heating process, the preliminary cooling process and the main cooling process) are implemented in-line in the roll forming apparatus 1. Thereby, it is possible to quench the roll-formed product while performing the roll forming, thereby improving the productivity.

Figure 5A:
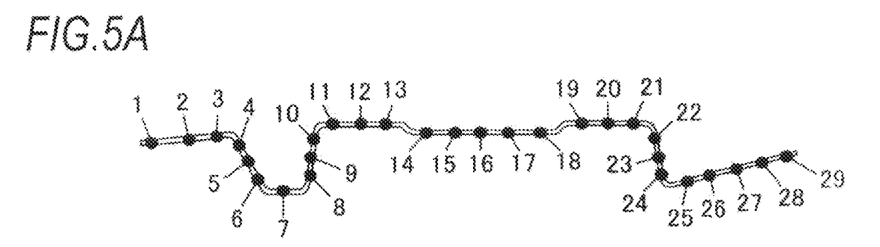
FIGS. 5A and 5B illustrate measuring points of tensile strength of a product roll-formed by a method of the illustrative embodiment and tensile strengths at the measuring points.
Figure 5B:
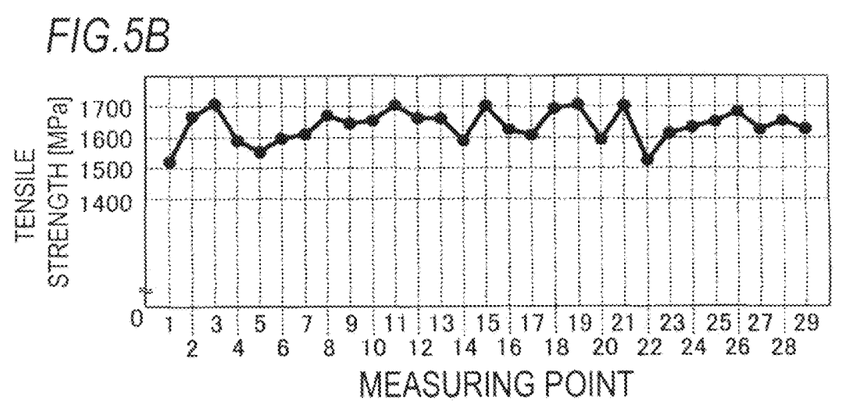

The tensile strength of the product roll-formed by the method described in the illustrative embodiment will be described. FIGS. 5A and 5B illustrate measuring points of the tensile strength of the roll-formed product and the tensile strengths at the measuring points. FIG. 5A illustrates the measuring points of the tensile strength of the roll-formed product, and FIG. 5B is a graph illustrating the tensile strengths at the measuring points. Meanwhile, a tensile test was performed only at the measuring point 16 of FIG. 5A, and the Rockwell hardness was measured at all the measuring points. From the measured Rockwell hardness, the tensile strengths were estimated at the respective measuring points except for the measuring point 16. As can be seen from FIG. 5B, the tensile strengths were 1,500 MPa or higher at all the measuring points. When a target value (the lowest value) of the tensile strength of the roll-formed product is 1,500 MPa, the target value is surpassed at all the measuring points.

Figure 6A:
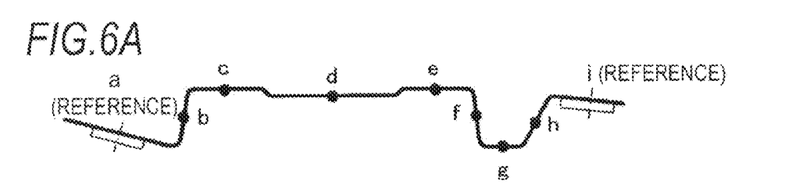
FIGS. 6A, 6B and 6C illustrate an amount of cross-sectional deformation caused due to heating (quenching) of the product roll-formed by the method of the illustrative embodiment.
Figure 6B:
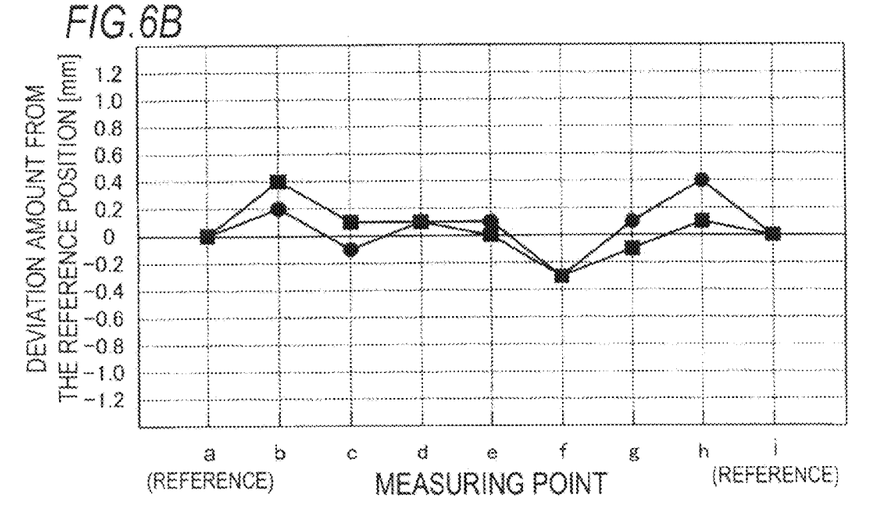
Figure 6C:
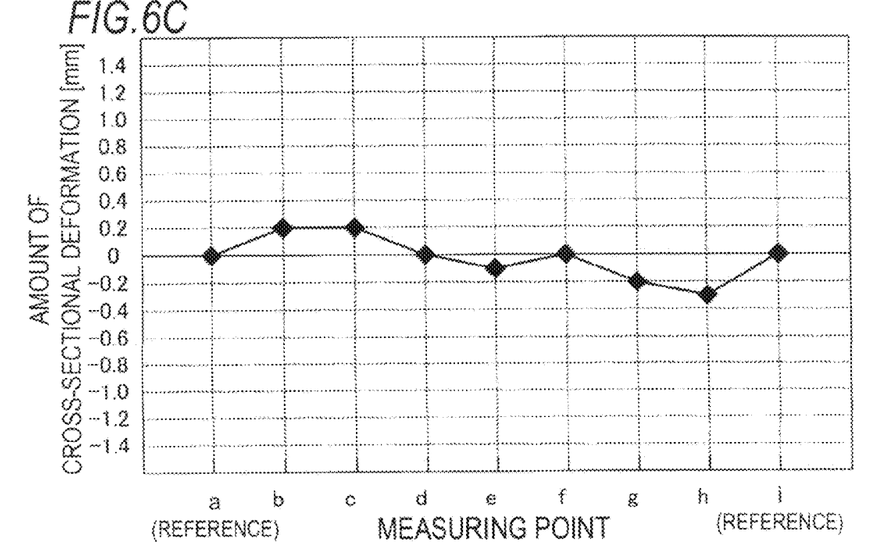

Also, an amount of the cross-section deformation by the heating (quenching) of the product roll-formed by the method described in the illustrative embodiment was measured. FIGS. 6A, 6B and 6C illustrate an amount of the cross-sectional deformation caused due to the heating (quenching) of the product roll-formed. FIG. 6A illustrates the measuring points of the amount of the cross-sectional deformation of the roll-formed product, FIG. 6B is a graph illustrating deviation amounts from a reference position at the measuring points before the heating and deviation amounts from the reference position after the heating, and FIG. 6C is a graph illustrating differences (amounts of the cross-sectional deformation) of the deviation amounts at the measuring points before and after the heating. Here, in FIG. 6A, the measuring points 'a' and 'i' were set as the reference (at which the amount of the cross-sectional deformation is zero (0)). Also, in FIG. 6B, a normal position of each measuring point on the basis of the measuring points 'a' and 'i' was set as a reference position and a deviation amount from the reference position was measured. In FIG. 6B, a measuring result shown with a circle indicates a deviation amount of the cross-sectional shape of the steel strip H from the reference position just after the steel strip H passed through the forming roll die 20 and before it passed through the induction heating coil 311 (i.e., before the quenching). Also, a measuring result shown with a square indicates a deviation amount of the cross-sectional shape of the steel strip H from the reference position after the steel strip H was cooled by the cooling water supply device 34 (i.e., after the quenching). Also, FIG. 6C indicates a value obtained by subtracting the measuring result shown with the circle from the measuring result shown with the square, i.e., a calculation result of the amount of the cross-sectional deformation caused due to the quenching. As can be seen from FIG. 6C, when the steel strip H is roll-formed by the method described in this illustrative embodiment, the amount of the cross-sectional deformation before and after the quenching was suppressed to 0.3 mm or smaller.

Figure 7A:
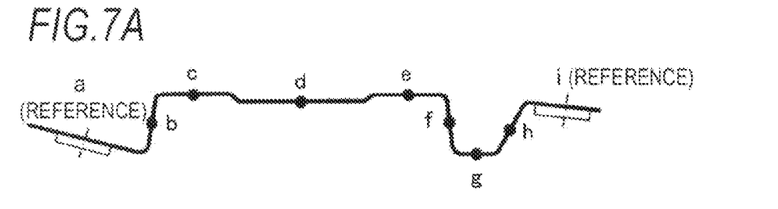
FIGS. 7A, 7B and 7C illustrate an amount of cross-sectional deformation caused due to heating (quenching) of the roll-formed product in case that the product is subject to a cross-sectional forming process and is then quenched without a correction process.
Figure 7B:
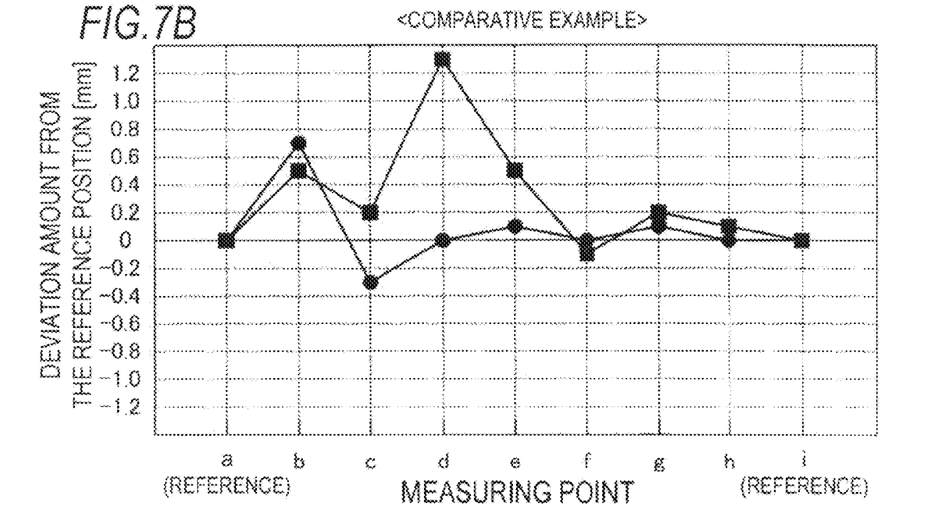
Figure 7C:
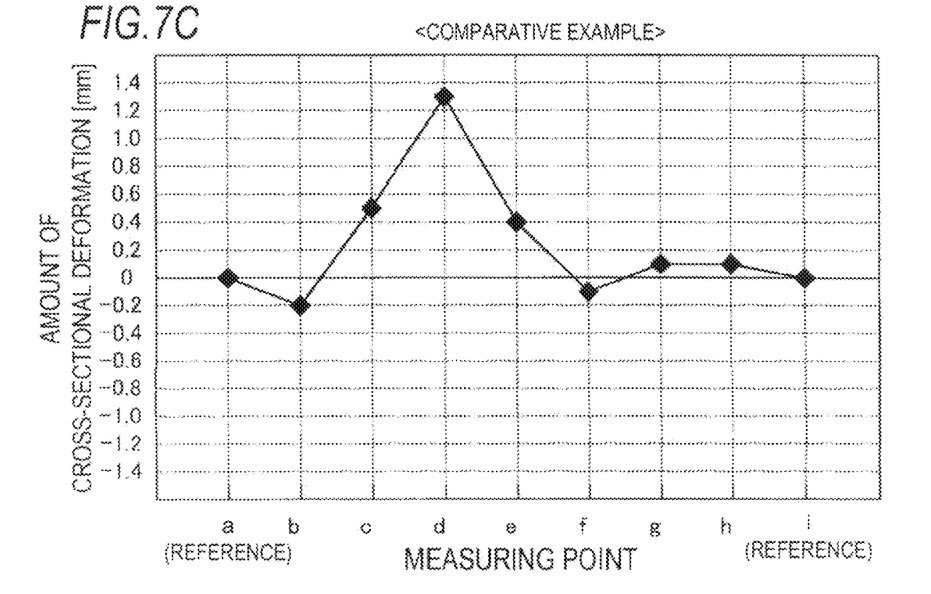

FIGS. 7A, 7B and 7C illustrate an amount of the cross-sectional deformation caused due to the heating (hardening) of the roll-formed product in case that the product is subject to the cross-sectional forming process and is then quenched without the correction process. FIG. 7B corresponds to FIG. 6B, and FIG. 7C corresponds to FIG. 6C. As can be seen from FIG. 7C, a maximum value of the amount of the cross-sectional deformation after the quenching was 1.3 mm. From this result, it can be seen that when the steel strip H is roll-formed by the method described in this illustrative embodiment, the deformed cross-section of the steel strip H is securely corrected in the cross-section correcting process and the amount of the cross-sectional deformation before and after the quenching can be considerably reduced.

Figure 8A:
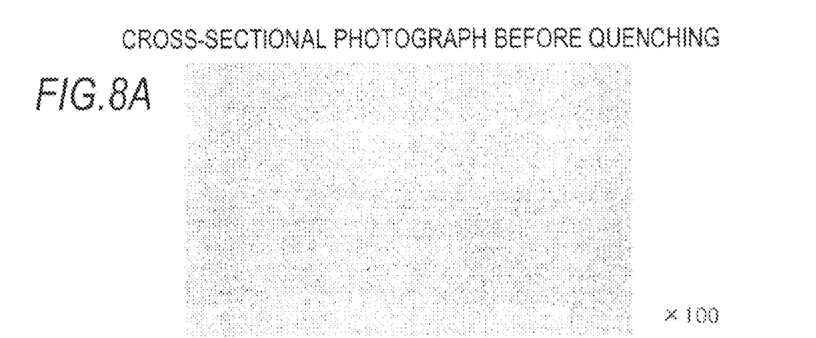
FIGS. 8A and 8B are enlarged photographs of a cross-section of the steel strip H just after passing through a forming roll die and before passing through an induction heating coil (i.e., before the quenching)
Figure 8B:
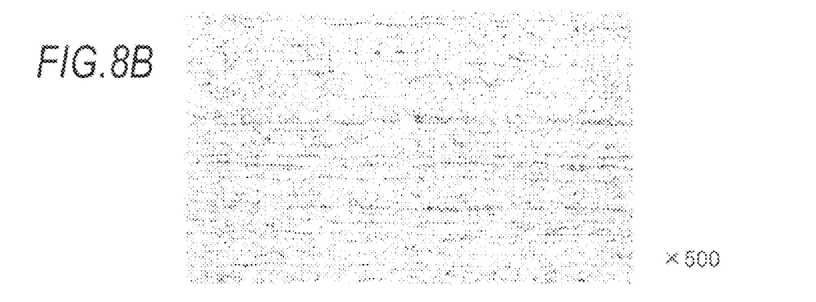
Figure 9A:
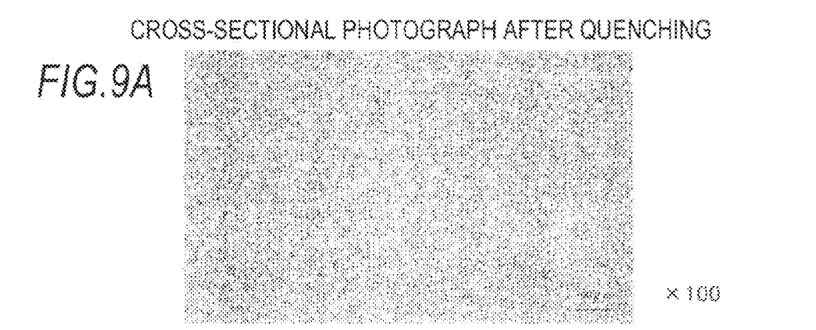
FIGS. 9A and 9B are enlarged photographs of a cross-section of the steel strip H after it is cooled by a cooling water supply apparatus (i.e., after the quenching).
Figure 9B:
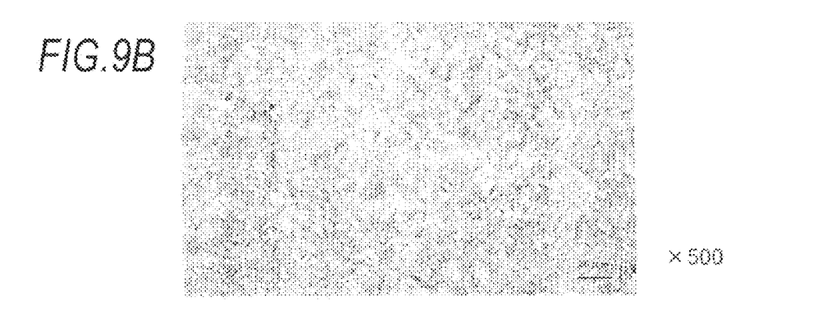

FIGS. 8A and 8B are enlarged photographs of the cross-section of the steel strip H just after passing through the forming roll die 20 and before passing through the induction heating coil 311 (i.e., before the quenching). FIG. 8A illustrates an enlarged photograph of 100 magnification, and FIG. 8B illustrates an enlarged photograph of 500 magnification. In the meantime, FIGS. 9A and 9B are enlarged photographs of the cross-section of the steel strip H after it was cooled by the cooling water supply apparatus 34 (i.e., after the quenching). FIG. 9A illustrates an enlarged photograph of 100 magnification, and FIG. 9B illustrates an enlarged photograph of 500 magnification. As can be seen from the comparison of FIGS. 8A and 9B or FIGS. 8B and 9B, the texture was changed by the quenching. Hence, it can be seen that when the steel strip H is roll-formed by the method described in this illustrative embodiment, the steel strip H is sufficiently quenched and hardened.

As described above, the roll forming method of this illustrative embodiment includes the cross-section forming process causing the steel strip H, which is fed in the longitudinal direction from the uncoiler 10, to pass through the forming roll die 20 so that the cross-sectional shape of the steel strip H is formed into a predetermined cross-sectional shape, the heating process of heating the steel strip H having passed through the forming roll die 20 to the first temperature of the austenitizing temperature or higher, the preliminary cooling process of cooling the steel strip H heated to the first temperature in the heating process to the second temperature lower than the austenitizing temperature and equal to or higher than the martensite transformation point, the cross-section correcting process causing the steel strip H cooled to the second temperature in the preliminary cooling process to pass through the correction roll stand 33 and correcting the cross-sectional shape of the steel strip H and the main cooling process of cooling the steel strip H having passed through the correction roll stand 33 to the third temperature lower than the martensite transformation point.

Also, the roll forming apparatus 1 of this illustrative embodiment includes the forming roll die 20 configured to form the steel strip H, which is fed in the longitudinal direction, into a predetermined cross-sectional shape, the induction heater 31 that heats the steel strip H having passed through the forming roll die 20 to the first temperature of the austenitizing temperature or higher, the air blowing device 32 that cools the steel strip H heated by the induction heater 31 to the second temperature lower than the austenitizing temperature and equal to or higher than the martensite transformation point, the correction roll stand 33 that corrects the cross-sectional shape of the steel strip H cooled to the second temperature by the air blowing device 32 and the cooling water supply device 34 that cools the steel strip H having passed through the correction roll stand 33 to the third temperature lower than the martensite transformation point.

According to the illustrative embodiment, the heat treatment is not performed after the roll forming of the steel strip H is completed. Instead, during the heat treatment, in particular, after the heat treatment starts and before the hardening of the steel strip H by the heat treatment starts, the cross-sectional shape of the steel strip H is corrected by the correction roll stand 33 and the roll forming is then completed. After that, the steel strip H is cooled by the cooling water supply device 34 and the heat treatment is thus completed. Since the temperature of the steel strip H is maintained at the martensite transformation point or higher at the time at which the cross-sectional shape is corrected by the correction roll stand 33, the hardening by the quenching is not caused. Therefore, it is possible to obtain the desired cross-sectional shape in the cross-section correcting process and to harden the roll-formed product in the main cooling process thereafter. As a result, it is possible to obtain the roll-formed product in which the cross-sectional deformation caused due to the heat treatment is suppressed.

According to the illustrative embodiment, the heating process and the preliminary cooling process are performed before the steel strip H having passed through the forming roll die 20 is fed to the correction roll stand 33. That is, the heating process and the preliminary cooling process are performed for the steel strip H that is being fed along the path line formed between the forming roll die 20 and the correction roll stand 33 in the roll forming apparatus 1. That is, since the heating and preliminary cooling of the steel strip H are performed in the roll forming apparatus 1 (i.e., in-line), the productivity is improved. Also, the main cooling process is performed for the steel strip having passed through the correction roll stand 33 in the roll forming apparatus 1. Hence, since the forming and quenching of the cross-sectional shape of the steel strip H are completed in the roll forming line, the productivity is further improved.

According to the illustrative embodiment, in the main cooling process, the steel strip H just after it has passed through the correction roll stand 33 is cooled. Specifically, the cooling water supply device 34 injects the cooling water from the downstream side of the correction roll stand 33 towards the correction roll stand 33, so that the steel strip H just after it has been discharged from the correction roll stand 33 is cooled. Hence, the steel strip H is cooled while the cross-sectional shape of the steel strip H is corrected. When correcting the cross-sectional shape, the cross-section of the steel strip H is restrained by the roll dies. Therefore, in this illustrative embodiment, the steel strip H is cooled (quenched) while the cross-sectional shape of the steel strip H is restrained. Thereby, the roll quenching method having high productivity is established.

According to the illustrative embodiment, the air blowing device 32 is configured to inject (contact) the compressed air flowing towards the feeding direction of the steel strip H to the heated steel strip H. Specifically, the air blowing device 32 injects the compressed air from the upstream side of the correction roll stand 33 towards the correction roll stand 33, thereby cooling the steel strip H just before it is fed to the correction roll stand 33. According to this configuration, the air to be injected to the steel strip H suppresses the cooling water, which is injected to the steel strip H from the cooling water supply device 34, from being moved upwards. As a result, it suppresses a situation where the cooling water flows in the opposite direction to the feeding direction of the steel strip H and is introduced into the induction heater 31 to cause a bad influence on the heating of the steel strip H.

According to the illustrative embodiment, since the induction heater 31 is used to heat the steel strip H, the steel strip H can be heated in a moment. Also, the energization to the induction heating coil 311 is controlled, so that it is possible to form a heated part and a non-heated part in the steel strip H. The non-heated part is less quenched than the heated part and is thus softer. Therefore, it is possible to easily manufacture the roll-formed product having a desired length by forming the non-heated part every desired length of the steel strip H and cutting the non-heated part by the cutting device 40.

According to the illustrative embodiment, since the injection port of the air nozzle 323 is directed towards the introducing part (the part into which the steel strip H is introduced) of the correction roll stand 33 positioned at the downstream side of the injection port, the upper-side roll die 331 and the lower-side roll die 332 of the correction roll stand 33 are also cooled by the compressed air injected from the air nozzle 323. Also, since the injection port of the cooling water injection nozzle 343 is directed towards the ejecting part (the part through which the steel strip H is discharged) of the correction roll stand 33 positioned at the upstream side of the injection port, the upper-side roll die 331 and the lower-side roll die 332 of the correction roll stand 33 are also cooled by the cooling water injection nozzle 343.

According to the illustrative embodiment, the first temperature is equal to or higher than an austenitizing temperature and is lower than an evaporation temperature of a plating material of the steel strip. Accordingly, even in case that the steel strip is austenitized and then is to be the martensite, it is suppressed that the plating material of the steel strip is reduced due to the evaporation.

According to the illustrative embodiment, the second temperature is equal to or higher than a martensite transformation point and is lower than an adherence temperature of a plating material of the steel strip. Accordingly, even in case that the steel strip is set to the second temperature and then performs processes such as the roll forming, it is suppressed that the plating material of the steel strip is adhered to the other parts.

Although the illustrative embodiment of this disclosure has been described, this disclosure is not limited to the illustrative embodiment. For example, in the above illustrative embodiment, the zinc-plated steel plate has been exemplified as the steel strip H. However, the other metallic plate can be also used. Also, in the above illustrative embodiment, the air blowing device 32 is used as the preliminary cooling device. However, the other cooling device, for example a cooling device that injects a gas-liquid mixed cooling medium of a mist shape may be used. Also, in the above illustrative embodiment, the steel strip H is water-cooled in the main cooling process. However, the steel strip H may be oil-cooled. Like this, this disclosure can be changed without departing from the gist thereof.

What is claimed is:

1. A roll forming method comprising:
   performing a cross-section forming process to causing a steel strip, which is fed in a longitudinal direction, to pass through a forming roll die so that a cross-sectional shape of the steel strip is formed into a predetermined cross-sectional shape;
   performing a heating process of heating the steel strip having passed through the forming roll die to a first temperature that is equal to or higher than an austenitizing temperature;
   performing a preliminary cooling process of cooling the steel strip heated to the first temperature in the heating process to a second temperature lower than the austenitizing temperature and equal to or higher than a martensite transformation point;
   performing a cross-section correcting process of causing the steel strip cooled to the second temperature in the preliminary cooling process to pass through a correction roll die and correcting the cross-sectional shape of the steel strip, and
   performing a main cooling process of cooling the steel strip having passed through the correction roll die to a third temperature lower than the martensite transformation point.

2. The roll forming method according to claim 1,
   wherein a feeding direction of the steel strip is defined as a direction from an upstream towards a downstream, and
   wherein the main cooling process is a process of cooling the steel strip just after the steel strip is discharged from the correction roll die by injecting a cooling medium from a downstream side of the correction roll die towards the correction roll die.

3. The roll forming method according to claim 1,
   wherein the preliminary cooling process is a process of contacting with the steel strip heated in the heating process with a cooling medium flowing towards a feeding direction of the steel strip.

4. The roll forming method according to claim 2,
   wherein the heating process is a process of inductively heating the steel strip having passed through the forming roll die.

5. The roll forming method according to claim 1,
   wherein the first temperature is lower than an evaporation temperature of a plating material of the steel strip.

6. The roll forming method according to claim 1,
   wherein the second temperature is lower than an adherence temperature of a plating material of the steel strip.

7. A roll forming apparatus comprising:
   a forming roll die configured to form a steel strip, which is fed in a longitudinal direction, into a predetermined cross-sectional shape;
   a heating device that heats the steel strip having passed through the forming roll die to a first temperature that is equal to or higher than an austenitizing temperature;
   a preliminary cooling device that cools the steel strip heated by the heating device to a second temperature lower than the austenitizing temperature and equal to or higher than a martensite transformation point;
   a correction roll die that corrects the cross-sectional shape of the steel strip cooled by the preliminary cooling device, and
   a main cooling device that cools the steel strip having passed through the correction roll die to a third temperature lower than the martensite transformation point.

8. The roll forming apparatus according to claim 7,
   wherein a feeding direction of the steel strip is defined as a direction from an upstream towards a downstream, and
   wherein the main cooling device is configured to cool the steel strip just after the steel strip is discharged from the correction roll die by injecting a cooling medium from a downstream side of the correction roll die towards the correction roll die.

9. The roll forming apparatus according to claim 7,
   wherein the preliminary cooling device is configured to contact the steel strip heated by the heating device with a cooling medium flowing towards a feeding direction of the steel strip.

10. The roll forming apparatus according to claim 7,
    wherein the heating device is an induction heater comprising an induction heating coil arranged at a periphery of the steel strip having passed through the forming roll die and an energization control device controlling energization to the induction heating coil.

11. The roll forming apparatus according to claim 7,
    wherein the first temperature is lower than an evaporation temperature of a plating material of the steel strip.

12. The roll forming apparatus according to claim 7,
    wherein the second temperature is lower than an adherence temperature of a plating material of the steel strip.

* * * * *